May 12, 1936. S. VORECH 2,040,580
VALVE
Filed July 31, 1931
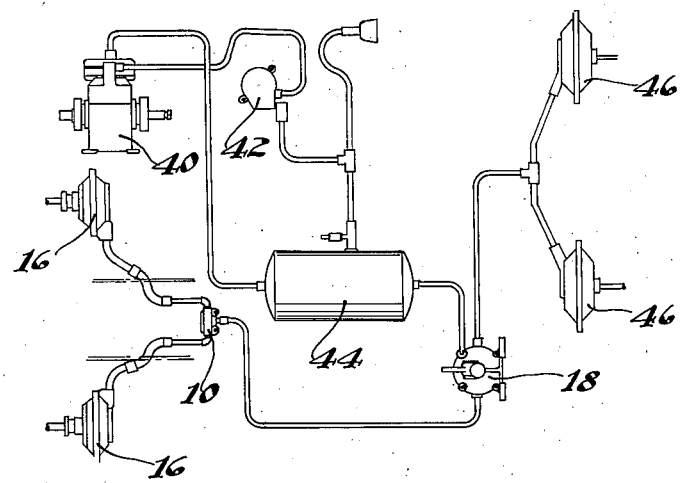
FIG. 1
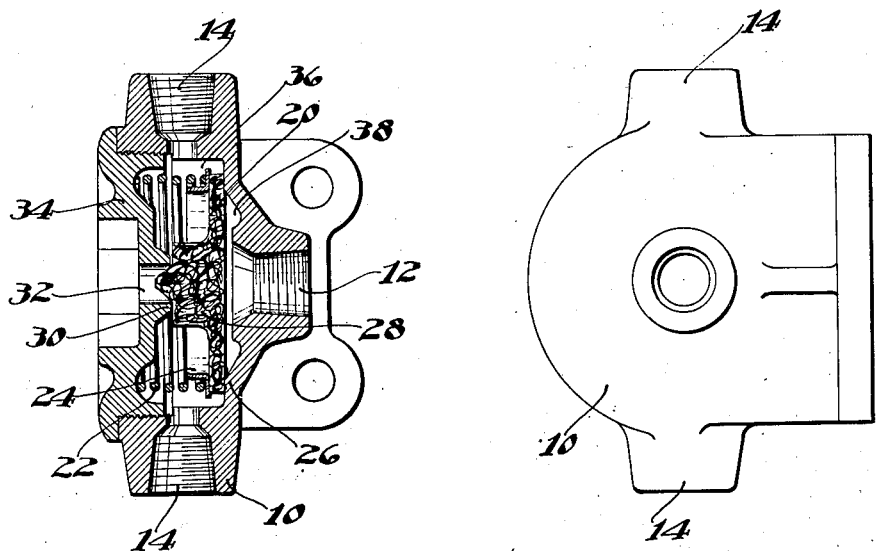
FIG. 2
FIG. 3
INVENTOR.
STEPHEN VORECH
BY H. O. Clayton
ATTORNEY.

Patented May 12, 1936

2,040,580

UNITED STATES PATENT OFFICE 2,040,580

VALVE

Stephen Vorech, Pittsburgh, Pa., assignor to Bendix-Westinghouse Automotive Air Brake Company, Pittsburgh, Pa., a corporation of Delaware Application July 31, 1931, Serial No. 554,167

8 Claims. (Cl. 188—152)

This invention relates to relief valves in general and in particular to a quick release valve for certain of the brake chambers in automotive air or pressure brake systems.

The principal object of my invention is to improve that type of valve mechanism disclosed in Patents Nos. 1,506,012 and 1,412,473 wherein there is disclosed a flexible diaphragm valve member operable, upon release of air pressure by the master or control valve, to effect a quick "blowing down" of the brake chamber; in the aforementioned patents, however, the flexed condition of the inherently resilient diaphragm is relied upon to insure the desired quick release action. However, experience has taught that due to warpage, inaccuracy of design and other factors that the diaphragm loses its effectiveness with use.

The principal object of the invention, therefore, is to provide a relief valve of this type wherein the action of the flexible diaphragm is uniform throughout the life of the valve, thus raising the efficiency thereof.

In one suggested embodiment, the diaphragm is spring pressed at its periphery against its seat, and is furthermore so preformed as to maintain the exhaust port of the valve open in brake off position.

Other objects of the invention and desirable details of construction and combinations of the various parts of the structure will become apparent from the following detailed description of a preferred embodiment of the invention taken in conjunction with the accompanying drawing, in which:

Figure 1 discloses diagrammatically air brake equipment for a truck or bus incorporating my novel quick release valve unit;

Figure 2 discloses, in section, the details of the relief valve; and

Figure 3 is a plan view of the valve of Figure 2.

In that embodiment of the invention disclosed in detail in Figure 2 there is suggested a quick release valve casing 10 having an inlet or fluid pressure supply port 12 and outlet ports 14, together providing communication between the front wheel brake chambers 16, Figure 1, and the master or control valve 18 of the air brake system. A flexible and resilient disk valve member 20, which is preferably, though not necessarily, of rubber or rubberized fabric, is, at its peripheral edge, pressed by coil spring 22 and spring seat 24 against the valve seat 26. The disk valve member 20 is preferably preformed in its unflexed state to provide a flat upper face, and a cylindrical central portion 28 is slightly spaced, in the brake off position of the valve parts, from seat 30 extending about the exhaust port 32 in the body of the valve casing. The valve cap 34, which is screw threaded into the casing 10, maintains the spring 22 under compression to press the diaphragm against its seat as just described.

In the construction disclosed in the aforementioned patents, which is quite similar to applicant's construction, the diaphragm, corresponding to applicant's diaphragm 20, is flexed or distorted to normally seat the valve at its periphery and also close the exhaust port. In the patent constructions, the diaphragm is not spring pressed against its seat and the exhaust port is normally closed as distinguished from the slight opening suggested by this improvement. However, with such a construction any change in shape of the diaphragm, due to warping or swelling, has a tendency to unseat the peripheral edge so that when the brakes are released the air under pressure in chamber 36 has a free passage to chamber 38 past the valve seat 26. This action either delays the seating of the diaphragm, or in extreme cases the seating never actually occurs, the brake cylinders being "blown down" via the master valve 18.

It will be appreciated from the above described construction that upon actuation of the brake valve device 18, when it is desired to apply the brakes, the rear brake chambers 46 will be actuated prior to the application of the front brake chambers 16 and to a greater degree, this being due to the provision of the spring 22 associated with the quick release valve 10 located between the brake valve and the front brake chambers. The pressure in the rear brake chambers 46 will build up substantially simultaneously upon actuation of the valve 18 while the front brake chambers will not have any pressure delivered thereto until the pressure in the supply port 12 and chamber 38 has reached a value sufficient to overcome the tension of spring 22 to deflect the marginal periphery of the diaphragm 28, which portion of the diaphragm thus forms an inlet valve. This last named valve will be immediately closed as soon as the pressure within the front brake chambers 16 and hence in the chamber 36 together with the tension of the spring 22 is slightly greater than the pressure in chamber 38. The tension of spring 22 may be such as to give any desired difference between rear and front brake chamber pressures, and springs of different characteristics may be substituted or the tension may be varied in accordance with the position of the screw-threaded cap 34 with respect to the casing 10.

It will also be noted that with such a construction, that is, wherein the exhaust port is normally closed by the diaphragm, that a sufficient pressure differential between chambers 36 and 38 must be developed to compensate for the exhaust valve area of the diaphragm before the diaphragm can be moved upwardly to "blow down" the brake chambers. All of these objectionable features of the aforementioned patents are obviated by the refinements of the valve of this invention.

Describing the operation of applicant's valve, actuation of the master valve 18 admits compressed air into chamber 38, setting up a pressure differential between chambers 38 and 36.

The spring 22 is made strong enough to insure a flexing of the diaphragm to close exhaust port 32 before the spring is collapsed to interconnect chambers 36 and 38 to supply pressure fluid to the front wheel brake chambers 16 and apply the brakes. In the operation of releasing the brakes the master valve is vented, placing the chamber 38 in communication with the atmosphere. The air under pressure in chamber 36, together with the potential energy of the compressed spring 22 and distorted disk, then functions to successively seat the diaphragm at 26 and open the exhaust port 32. The pressure in the brake chambers 16 is thus quickly "blown down" to atmospheric pressure via chamber 36 and port 32 and thence to the atmosphere, obviating a possible lag in brake release due to air flow which would otherwise ensue were the release valve omitted from the system. This gives the desired quick release of the more remote brakes, such as the front brakes of a truck of relatively long wheel base.

The remainder of the air brake structure, not previously referred to, is disclosed in Figure 1 and comprises a compressor 40 controlled by governor 42 and supplying air under pressure to reservoir 44. The aforementioned master valve 18 controls the operation of both the aforementioned front brake chambers 16 and rear brake chambers 46.

A very efficient quick release valve is thus provided, the spring 22 insuring a uniform valve operation throughout the life of the flexible rubber diaphragm 28, normally subject to deterioration with age. The spring 22 compels the successive closing of the exhaust port 32 and intercommunication of the inlet and outlet ports in the brake applying phase, and likewise compels the successive closing of the inlet port and opening of the exhaust port in the brake releasing phase of operation; such a structure also permits of a normally opened exhaust port and compensates for the inevitable distortion and warpage of the diaphragm.

While one illustrative embodiment has been described, it is not my intention to limit the scope of the invention to that particular embodiment, or otherwise than by the terms of the appended claims.

I claim:

1. A relief valve of the class described comprising a casing having inlet, outlet and exhaust ports, a flexible diaphragm in said casing normally free from initial flexure, said diaphragm in its normally off position closing the communication between the inlet and outlet ports and maintaining an unobstructed communication between the outlet and exhaust ports, said diaphragm including a centrally disposed enlarged portion adapted to control said exhaust port.

2. A relief valve of the class described comprising a casing having inlet, outlet and exhaust ports, a spring pressed flexible diaphragm in said casing normally free from initial flexure, said diaphragm in its normally off position closing communication between the inlet and outlet ports under the action of said spring and maintaining an unobstructed communication between the outlet and exhaust ports, said diaphragm including a centrally disposed enlarged portion adapted to control said exhaust port.

3. A quick release valve comprising a casing having inlet, outlet and exhaust ports, a flexible diaphragm in said casing normally free from initial flexure and yieldable means under compression acting upon the marginal portion of said diaphragm tending to seat the same about the periphery thereof and close off communication between said inlet and outlet ports, said diaphragm being normally spaced from said exhaust port.

4. In a relief valve, a casing having inlet, outlet and exhaust ports therein, a flexible diaphragm in said casing normally free from initial flexure, the marginal portion of said diaphragm adapted to intercommunicate said inlet and outlet ports, said diaphragm having an enlarged central portion adapted to intercommunicate said outlet and exhaust ports, said diaphragm being preformed to maintain communication between said latter ports in the off or release position of the valve parts.

5. In a valve, a casing having a pair of aligned ports, and a pair of outlet openings therein, a flexible diaphragm in said casing normally free from initial flexure, a portion thereof adapted to intercommunicate one of said ports and said openings and a second portion adapted to intercommunicate said openings, said diaphragm being preformed to maintain communication between said latter port and openings in the off or release position of the valve parts and yieldable means in said casing acting upon the marginal portion of said diaphragm to cut off communication between said one of said ports and said openings in the off position of the valve parts.

6. In a relief valve, a casing having inlet, outlet and exhaust ports therein, a flexible diaphragm in said casing normally free from initial flexure, a portion thereof adapted to intercommunicate said inlet and outlet ports and a second portion adapted to intercommunicate said outlet and exhaust ports, said diaphragm being preformed to maintain communication between said latter ports in the off or release position of the valve parts and yieldable means in said casing acting upon the marginal portion of said diaphragm to cut off communication between said inlet and outlet ports in the said release position of the valve parts, said yieldable means being of sufficient strength, taken in conjunction with the construction and arrangement of the diaphragm, to insure a successive closing of the exhaust port and intercommunication of the inlet and outlet ports during application of fluid under pressure to said casing through said inlet, and further to insure a successive closing of the communication between the inlet and outlet ports and opening of the exhaust port when said inlet is connected to atmosphere.

7. A relief valve for an air brake system comprising a casing having a pair of axially aligned ports and a plurality of laterally extending outlet openings, a flexible diaphragm within said casing normally free from initial flexure for controlling the flow of fluid under pressure through said ports and openings, the central portion of said diaphragm being normally spaced from one of said ports but adapted to engage and close said port in response to the flow of fluid under pressure into said casing, and resilient means for maintaining the marginal portion of said diaphragm in contact with the wall of said casing to cut off communication between the other port and said outlet openings, said resilient means being so proportioned that the central portion of said diaphragm deflects to close off said first port and subsequently the marginal portion of said diaphragm deflects to interconnect the other port and said openings.

8. In an air pressure operated braking system for vehicles having front and rear brakes, a reservoir of air under pressure, air pressure operated actuators for said brakes, connections between said reservoir and actuators, a brake valve in said connections for simultaneously applying air under pressure from said reservoir to said actuators, and valvular means in said front brake actuator connections between said front brake actuators and said brake valve for controlling the flow of air under pressure to said front brake actuators, said means having a pressure responsive element subject to the pressure of the air supplied said front brake actuators and being spring loaded to close off the flow of air to said last named actuators when the pressure in the latter is less than the pressure admitted by said brake valve by a predetermined differential whereby the pressure admitted to the front brake actuators will be less than but proportional to the pressure admitted to said rear brake actuators throughout the range of pressures admitted by said brake valve.

STEPHEN VORECH.